(12) United States Patent
Georgis

(10) Patent No.: US 10,963,720 B2
(45) Date of Patent: Mar. 30, 2021

(54) ESTIMATING GROUPED OBSERVATIONS

(71) Applicant: Sony Corporation, Tokyo (JP)

(72) Inventor: Nikolaos Georgis, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 121 days.

(21) Appl. No.: 16/137,313

(22) Filed: Sep. 20, 2018

(65) Prior Publication Data

US 2019/0370588 A1  Dec. 5, 2019

Related U.S. Application Data

(60) Provisional application No. 62/678,403, filed on May 31, 2018.

(51) Int. Cl.
| | | |
|---|---|---|
| *G06K 9/32* | (2006.01) | |
| *G06K 9/00* | (2006.01) | |
| *G06K 9/62* | (2006.01) | |

(52) U.S. Cl.
CPC .......... *G06K 9/325* (2013.01); *G06K 9/00483* (2013.01); *G06K 9/623* (2013.01)

(58) Field of Classification Search
CPC .... G06K 9/325; G06K 9/623; G06K 9/00483; G06K 2209/15; G06K 2209/01; G06K 9/3258; G06K 9/6293
USPC ........................................................ 382/209
See application file for complete search history.

(56) References Cited

U.S. PATENT DOCUMENTS

| | | | |
|---|---|---|---|
| 7,162,102 B2 | 1/2007 | Cahill et al. | |
| 2012/0275653 A1* | 11/2012 | Hsieh | G06K 9/325 |
| | | | 382/105 |
| 2013/0259314 A1* | 10/2013 | Kozitsky | G06K 9/3258 |
| | | | 382/105 |
| 2014/0307923 A1* | 10/2014 | Johansson | G06K 9/00624 |
| | | | 382/105 |
| 2015/0060551 A1* | 3/2015 | Fleming | G06K 7/14 |
| | | | 235/462.42 |
| 2015/0310601 A1 | 10/2015 | Rodriguez | |
| 2016/0078759 A1* | 3/2016 | Nerayoff | H04N 5/23203 |
| | | | 701/3 |
| 2017/0161593 A1* | 6/2017 | Smithson | B60R 13/10 |
| 2018/0101750 A1* | 4/2018 | Soldevila | G06K 9/4628 |
| 2018/0107892 A1* | 4/2018 | Istenes | G06K 9/6292 |
| 2018/0122153 A1* | 5/2018 | Shin | G06Q 50/30 |
| 2018/0189590 A1* | 7/2018 | Fuchigami | G06K 9/00798 |
| 2018/0300578 A1* | 10/2018 | Wilbert | H04W 4/40 |
| 2019/0228276 A1* | 7/2019 | Lei | G06K 9/3258 |
| 2019/0244045 A1* | 8/2019 | Blais-Morin | G06K 9/3216 |
| 2019/0244301 A1* | 8/2019 | Seth | G06F 16/73 |

FOREIGN PATENT DOCUMENTS

| | | | | |
|---|---|---|---|---|
| JP | 2009169827 | * | 7/2009 | ............... G06K 9/03 |
| JP | 5517410 | * | 6/2014 | ............... G06K 9/03 |

* cited by examiner

*Primary Examiner* — Jerome Grant, II

(74) *Attorney, Agent, or Firm* — Trellis IP Law Group, PC

(57) ABSTRACT

Implementations generally relate to estimating grouped observations. In some implementations, a method includes detecting a license plate of a vehicle. The method further includes capturing a plurality of images of the license plate. The method further includes determining candidate characters from the images of the license plate. The method further includes selecting target characters from the candidate characters based on one or more predetermined selection criteria.

20 Claims, 5 Drawing Sheets

Positions

P1  P2  P3  P4  P5  P6

Rankings

| P1 | P2 | P3 | P4 | P5 | P6 |
|---|---|---|---|---|---|
| A = 100% | B = 75% | C = 100% | 1 = 100% | 2 = 75% | 3 = 100% |
|  | A = 25% |  |  | 1 = 25% |  |

ESTIMATING GROUPED OBSERVATIONS

CROSS REFERENCE TO RELATED APPLICATIONS

This application claims priority from U.S. Provisional Patent Application No. 62/678,403, entitled "INCREMENTAL AND EFFICIENT MAXIMUM LIKELIHOOD ESTIMATE OF GROUPED AI OBSERVATIONS," filed on May 31, 2018, which is hereby incorporated by reference as if set forth in full in this application for all purposes.

BACKGROUND

In law enforcement, a typical workflow may include performing automated license plate recognition when following offender cars. In most cases, artificial intelligence pipelines or traditional computer vision techniques often result in multiple license place readings for the same license plate of the car being followed. Conventional various state of the art techniques are inefficient and are not accurate, as such techniques cannot cope with poor results from the object detection algorithms or optical character recognition errors and camera noise.

SUMMARY

Implementations generally relate to estimating grouped observations. In some implementations, a system includes one or more processors, and includes logic encoded in one or more non-transitory computer-readable storage media for execution by the one or more processors. When executed, the logic is operable to perform operations including detecting a license plate of a vehicle. The logic when executed is further operable to perform operations including capturing a plurality of images of the license plate. The logic when executed is further operable to perform operations including determining candidate characters from the images of the license plate. The logic when executed is further operable to perform operations including selecting target characters from the candidate characters based on one or more predetermined selection criteria.

With further regard to the system, in some implementations, the plurality of images show the license plate at different perspectives. In some implementations, the logic when executed is further operable to perform operations including determining the candidate characters based on one or more character recognition techniques. In some implementations, the one or more predetermined selection criteria include selecting target characters from among the candidate characters based on cross correlation over the plurality of images. In some implementations, the one or more predetermined selection criteria include selecting target characters from among the candidate characters based on one or more longest common subsequence (LCS) techniques. In some implementations, to select the target characters, the logic when executed is further operable to perform operations including: comparing a first string of characters of a first image of the plurality of images of the license plate to a second string of characters of a second image of the plurality of images of the license plate; identifying matched characters between the first string of characters and the second string of characters; and selecting the target characters based on the identifying of the matched characters. In some implementations, the logic when executed is further operable to perform operations outputting a string of the selected target characters, where the string of the selected target characters represents actual characters of the license plate.

In some embodiments, a non-transitory computer-readable storage medium with program instructions thereon is provided. When executed by one or more processors, the instructions are operable to perform operations including detecting a license plate of a vehicle. The instructions when executed are further operable to perform operations including capturing a plurality of images of the license plate. The instructions when executed are further operable to perform operations including determining candidate characters from the images of the license plate. The instructions when executed are further operable to perform operations including selecting target characters from the candidate characters based on one or more predetermined selection criteria.

With further regard to the computer-readable storage medium, in some implementations, the plurality of images show the license plate at different perspectives. In some implementations, the instructions when executed are further operable to perform operations including determining the candidate characters based on one or more character recognition techniques. In some implementations, the one or more predetermined selection criteria include selecting target characters from among the candidate characters based on cross correlation over the plurality of images. In some implementations, the one or more predetermined selection criteria include selecting target characters from among the candidate characters based on one or more longest common subsequence (LCS) techniques. In some implementations, to select the target characters, the instructions when executed are further operable to perform operations including: comparing a first string of characters of a first image of the plurality of images of the license plate to a second string of characters of a second image of the plurality of images of the license plate; identifying matched characters between the first string of characters and the second string of characters; and selecting the target characters based on the identifying of the matched characters. In some implementations, the instructions when executed are further operable to perform operations outputting a string of the selected target characters, where the string of the selected target characters represents actual characters of the license plate.

In some implementations, a method includes detecting a license plate of a vehicle. The method further includes capturing a plurality of images of the license plate. The method further includes determining candidate characters from the images of the license plate. The method further includes selecting target characters from the candidate characters based on one or more predetermined selection criteria.

With further regard to the method, in some implementations, the plurality of images show the license plate at different perspectives. In some implementations, the method further includes determining the candidate characters based on one or more character recognition techniques. In some implementations, the one or more predetermined selection criteria include selecting target characters from among the candidate characters based on cross correlation over the plurality of images. In some implementations, the one or more predetermined selection criteria include selecting target characters from among the candidate characters based on one or more longest common subsequence (LCS) techniques. In some implementations, to select the target characters, the method further includes comparing a first string of characters of a first image of the plurality of images of the license plate to a second string of characters of a second image of the plurality of images of the license plate; identifying matched characters between the first string of characters and the second string of characters; and selecting the target characters based on the identifying of the matched characters.

A further understanding of the nature and the advantages of particular implementations disclosed herein may be realized by reference of the remaining portions of the specification and the attached drawings.

BRIEF DESCRIPTION OF THE DRAWINGS

FIG. 4 illustrates example positions in a character string and candidate characters, according to some implementations.

DETAILED DESCRIPTION

Implementations described herein enable, facilitate, and manage the estimating of grouped observations. In some implementations, a system detects a license plate of a vehicle, and captures multiple images of the license plate. The system further determines candidate characters from the images of the license plate. The system further selects target characters from the candidate characters based on one or more predetermined selection criteria, where the target characters represent the actual characters of the license plate.

Implementations overcome limitations of conventional techniques by using an efficient algorithm that statistically and incrementally consolidates results in order to obtain a single result from a group of frames of the same car license plate. As described in more detail herein, a system performs incremental and efficient maximum likelihood estimations of grouped observations.

Figure 1:
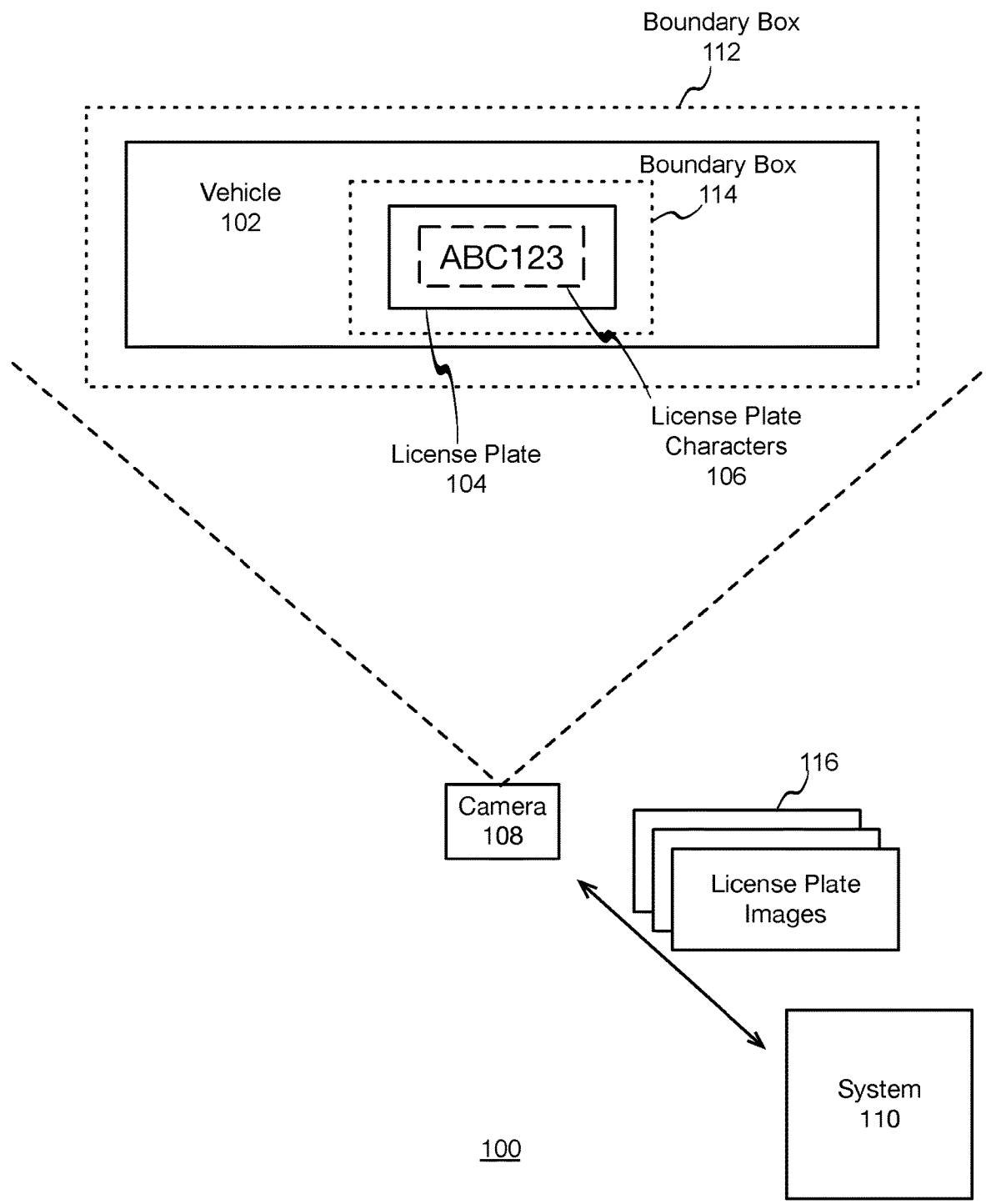
FIG. 1 illustrates a block diagram of an example environment 100, which may be used for some implementations described herein.

FIG. 1 illustrates a block diagram of an example environment 100, which may be used for some implementations described herein. In some implementations, environment 100 includes a vehicle 102 that has a license plate 104 with license plate characters 106. Also shown are a camera 108 and a system 110. In various implementations, camera 108 may be integrated into system 110 and/or may be accessed and controlled by system 110 via a network.

In operation, camera 108 captures images, and system 110 generates boundary boxes such as boundary box 112 and boundary box 114 for capturing images. For example, boundary box 112 covers vehicle 102, and boundary box 114 covers license plate 104.

As described in more detail herein, camera 108 captures multiple images of license plate 104 including license plate characters 106. Such images may be referred to as license plate images 116. Camera 108 sends license plate images 116 to system 110 for processing, including estimating license plate characters 106. Further example implementations are described in more detail herein.

For ease of illustration, FIG. 1 shows one block for each of vehicle 102, camera 108 and system 110. Blocks 102, 108, and 110 may represent multiple vehicles, cameras, and systems. In other implementations, network environment 100 may not have all of the components shown and/or may have other elements including other types of elements instead of, or in addition to, those shown herein.

In various embodiments, system 110 may utilize various inference engines and libraries such as a deep neural network library and/or a compute library for deep neural networks, as well as various neural processors or graphical processor units (GPUs) for implementing embodiments described herein. In the various implementations described herein, a processor of system 110 causes the elements described herein (e.g., information, etc.) to be displayed in a user interface on one or more display screens.

Implementations may apply to any network system and/or may apply locally for an individual user. System 102 may perform the implementations described herein on a standalone computer, tablet computer, smartphone, etc. System 102 may perform implementations described herein individually or in combination with other devices.

Figure 2:
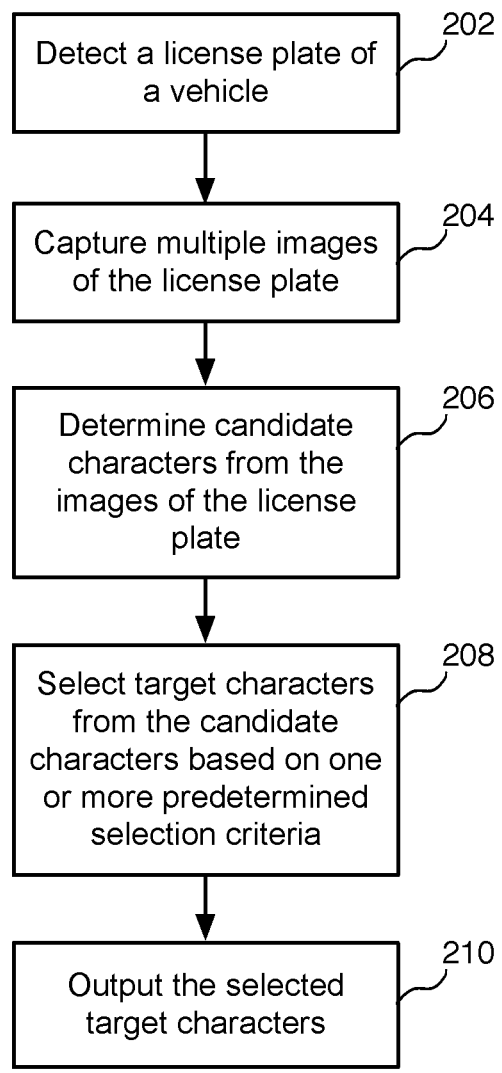
FIG. 2 illustrates an example flow diagram for estimating grouped observations, according to some implementations.

FIG. 2 illustrates an example flow diagram for estimating grouped observations, according to some implementations. Referring to both FIGS. 1 and 2, a method is initiated at block 202, where the system detects a license plate of a vehicle such as license plate 104 of vehicle 102. As indicated above, camera 108 captures images, and system 110 generates boundary boxes such as boundary box 112 that covers or boxes vehicle 102. System 110 may cause camera 108 to lock onto and track vehicle 102. System 110 generates boundary box 114 that boxes license plate 104. System 110 may cause camera 108 to lock onto and track license plate 104.

At block 204, the system captures multiple images of the license plate. In various embodiments, the images show the license plate at different perspectives. The multiple images may be captured by a rapid succession of photos or by video, depending on the particular implementation. Camera 108 then sends the multiple images (e.g., license plate images 116) to the system for processing. The number of images may vary depending on the particular implementation. For example, there may be 30 images, 50 images, 100 images, etc.

At block 206, the system determines candidate characters from the images of the license plate. For example, license plate characters 106 include the string of characters (e.g., "A", "B", "C", "1", "2", and "3") in respective positions of the string (e.g., first position, second position, third position, fourth position, fifth position, and sixth position). In various embodiments, the system determines the candidate characters based on one or more character recognition techniques. Such techniques may include optical character recognition (OCR) or suitable pattern recognition techniques. Because of limitations of character recognition techniques due to noise, camera movement, etc. Characters initially recognized by the system are referred to as candidate characters. Each image may be referred to as an observation, where each observation may have different characters recognized due to camera movement, noise, etc., as mentioned.

At block 208, the system selects target characters from the candidate characters based on one or more predetermined selection criteria. Because a given candidate character may be incorrect (e.g., not accurately representing the actual character in the given position), the system applies one or more predetermined selection criteria to select target characters, where the selected target characters are characters with the highest likelihood of being correct representations of the actual license plate characters. Example embodiments directed to selection criteria are described in more detail herein.

At block 210, the system outputs the selected target characters. As indicated above, the target characters represent the actual characters of the license plate to a high degree of accuracy based on the predetermined selection criteria.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 3:
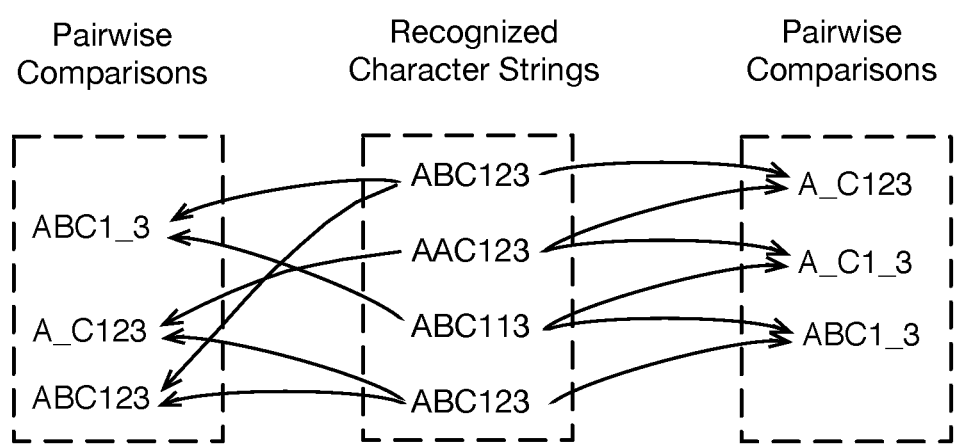
FIG. 3 illustrates example recognized character strings and pairwise comparisons, according to some implementations.

FIG. 3 illustrates example recognized character strings and pairwise comparisons, according to some implementations. As shown, the system may recognize multiple character strings of different character combinations (e.g., ABC123, AAC123, ABC113, ABC123, etc.). The character strings may differ due to various limitations associated with character recognition, including camera movement, noise, etc.

In various embodiments, predetermined selection criteria may include selecting target characters from among the candidate characters based on cross correlation over the images. For example, in some embodiments, as each new image is taken, the system compares each character string to every other character string captured in pairwise comparison (e.g., comparing each pair of character strings) in order to determine correlation among characters. For example, comparing character string ABC123 to character string AAC123 yields A_C123 as the common characters, where an underscore indicates no correlation of characters for a given position in the character string. Based on the pairwise comparisons, the system may determine the target characters (e.g., ABC123) to represent the actual characters of the license plate.

In various embodiments, predetermined selection criteria may include selecting target characters from among the candidate characters based on one or more longest common subsequence (LCS) techniques. For example, referring to the pairwise comparisons of FIG. 3, the system determines that the longest common string is ABC123. In some embodiments, because of potential discrepancies, the system may look for different common subsequences to correlate among different character strings. For example, the longest subsequences are ABC1 (three instances total) and C123 (three instances total). Based on LCS techniques, the system may determine the target characters (e.g., ABC123) to represent the actual characters of the license plate.

In various embodiments, the system may compare a first string of characters (e.g., ABC123) of a first image of multiple images of a license plate to a second string of characters (e.g., AAC123) of a second image of the plurality of images of the license plate. The system identifies matched characters between the first string of characters and the second string of characters. For example, the subsequence A_C123 of character string ABC123 matches the subsequence A_C123 of character string ACC123). The system continues such pairwise comparisons for all recognized character strings. The system then selects the target characters based on the identifying of the matched characters.

FIG. 4 illustrates example positions in a character string and candidate characters, according to some implementations. Shown are positions P1, P2, P3, P4, P5, and P6 for a target character string. In various embodiments, the system determines candidate characters for the character string. More specifically, the system determines candidate characters for each position (e.g., positions P1 to P6) of the target character string. In various embodiments, the target character string is initially empty (or not yet generated). The system subsequently selects candidate characters, where the selected candidate characters are referred to as target characters based on more or more predetermined selection criteria described herein. The predetermined selection criteria may vary, depending on the particular implementation.

As shown, the system ranks candidate characters for each position of the target character string. In various embodiments, the system may rank the candidate characters for a given position based on predetermined selection criteria.

In another example, the predetermined selection criteria may include selecting target characters from among the candidate characters based on frequency of occurrence. For example, referring to FIG. 4, for position P1, there is one candidate character A. Because there are no other candidate characters and character A has been recognized in position P1 100% of the instances, candidate character A would be the top ranking candidate character for position P1. As such, the system would select candidate character A as the target character, which would represent the actual character in position P1 of the license plate.

For position P2, there are two candidate characters A and B. Candidate character B has been recognized in position P2 75% of the instances. Candidate character C has been recognized in position P2 25% of the instances. Candidate character B is the top ranking candidate character for position P2. As such, the system would select candidate character B as the target character, which would represent the actual character in position P2 of the license plate. The system selects the remaining target characters for positions P3 to P6 in a similar manner. Again, the particular technique or techniques for ranking candidate characters may vary, depending on the particular implementation.

In various embodiments, the system outputs a string of the selected target characters, where the string of the selected target characters represent actual characters of the license plate. In this example implementation, the system may select target characters ABC123 to represent the actual characters of the license plate.

In various embodiments, the system may speed up the processing of images by using registers and counters to track the frequency of candidate characters for each position of the target character string. For example, referring to position P1 of FIG. 3, the candidate character A appears 4 times in 4 instances of character strings. A register or counter simply counts how often candidate character A appears in position P1. Similarly, the candidate character B appears 3 times in 4 instances of character strings, and the candidate character A appears 1 times in 4 instances of character strings. A register or counter counts how often candidate character B appears in position P2. A register or counter counts how often candidate character A appears in position P2. This technique saves time and resources, because the system simply increment registers or counters for each occurrence of a given candidate character in a given position.

In various embodiments, the system may generate weighted confidence values, for each position. For example, instead of a percentage of occurrences (e.g., 100%, 75%, etc.), the system may provide alternative scoring that reflects not only the frequency of occurrence in a given candidate character in a given position, but also reflects a given candidate character in one or more longest common subsequences (LCSs). For example, the system may give candidate character A in position P1 a score of 1.0. The system may give candidate character A in position P2 a score of 0.15. The weighted scores are probabilities that a given candidate character accurately represents the actual character in the license plate. As such, the system selects the candidate character with the highest probability accurately representing the actual character in the license plate.

In various embodiments, the system rejects outlier data from the group of data observations (e.g., license plate images) collected. For example, in some scenarios, a pedestrian or object may occlude one or more characters on a license plate. The system may reject that image in order to preserve the integrity of the collected data and to maintain statistical robustness.

Implementations described herein provide various benefits. For example, the system quickly and accurately estimates characters of a license plate. Implementations described herein also account for camera movement and random noise as images of a license plate are captured.

Figure 5:
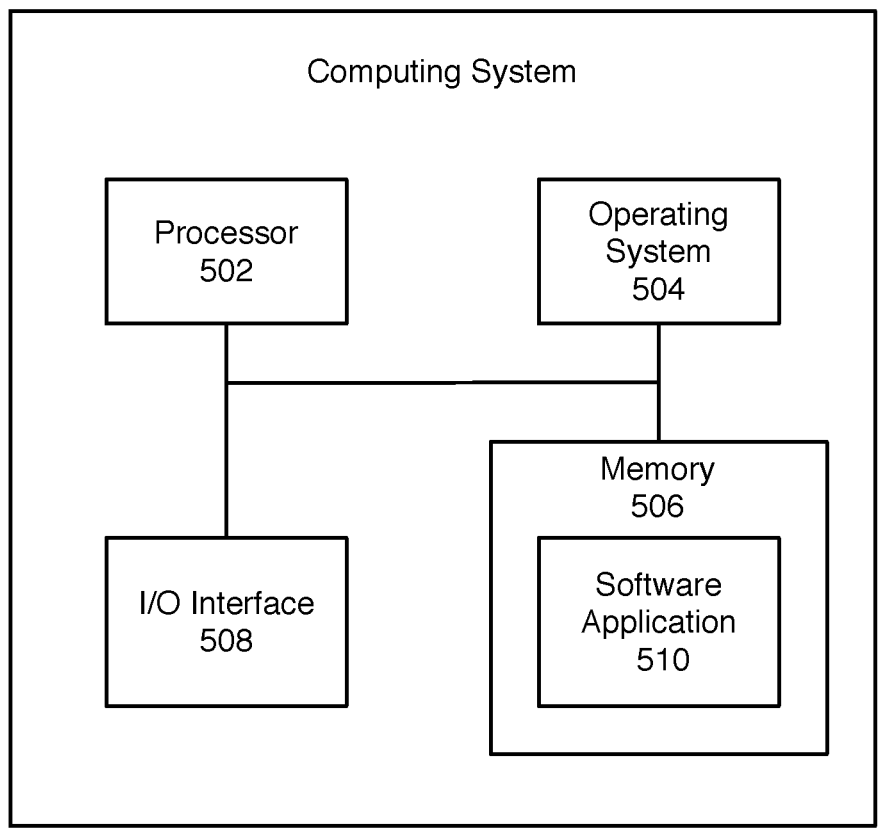
FIG. 5 illustrates a block diagram of an example computing system, which may be used for some implementations described herein.

FIG. 5 illustrates a block diagram of an example computing system 500, which may be used for some implementations described herein. For example, computing system 500 may be used to implement system 110 of FIG. 1, as well as to perform implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of computing system 500 or any suitable processor or processors associated with computing system 500 or any suitable system may perform the steps described. Implementations described herein may be carried out on a user device, on a server, or a combination of both.

Computing system 500 also includes a software application 510, which may be stored on memory 506 or on any other suitable storage location or computer-readable medium. Software application 510 provides instructions that enable processor 502 to perform the implementations described herein and other functions. Software application may also include an engine such as a network engine for performing various functions associated with one or more networks and network communications. The components of computing system 500 may be implemented by one or more processors or any combination of hardware devices, as well as any combination of hardware, software, firmware, etc.

For ease of illustration, FIG. 5 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   logic encoded in one or more non-transitory computer-readable storage media for execution by the one or more processors and when executed operable to perform operations comprising:
   detecting a license plate of a vehicle;
   capturing a plurality of images of the license plate
   recognizing character strings in the plurality of images;
   recognizing candidate characters in the character strings, wherein the candidate characters are characters that are initially recognized in a character string of the character strings;
   generating pairs of character strings from different images of the plurality of images;
   generating pairwise comparisons between the pairs of character strings;
   correlating the candidate characters based on the pairwise comparisons; and
   selecting target characters from the candidate characters based on one or more predetermined selection criteria.

2. The system of claim 1, wherein the logic when executed is further operable to perform operations comprising determining a position of each candidate character in a respective character string of the character strings, wherein the pairwise comparisons are based on a comparison of candidate characters in a same position.

3. The system of claim 1, wherein the logic when executed is further operable to perform operations comprising determining the candidate characters based on one or more character recognition techniques.

4. The system of claim 1, wherein the one or more predetermined selection criteria comprises selecting target characters from among the candidate characters based on cross correlation over the plurality of images.

5. The system of claim 1, wherein the one or more predetermined selection criteria comprises selecting target characters from among the candidate characters based on one or more longest common subsequence (LCS) techniques.

6. The system of claim 1, wherein, to select the target characters, the logic when executed is further operable to perform operations comprising:
   comparing a first string of characters of a first image of the plurality of images of the license plate to a second string of characters of a second image of the plurality of images of the license plate;
   identifying matched characters between the first string of characters and the second string of characters; and
   selecting the target characters based on the identifying of the matched characters.

7. The system of claim 1, wherein the logic when executed is further operable to perform operations comprising outputting a string of the target characters, and wherein the string of the target characters represents actual characters of the license plate.

8. A non-transitory computer-readable storage medium with program instructions stored thereon, the program instructions when executed by one or more processors are operable to perform operations comprising:
   detecting a license plate of a vehicle;
   capturing a plurality of images of the license plate;
   recognizing character strings in the plurality of images;
   recognizing candidate characters in the character strings, wherein the candidate characters are characters that are initially recognized in a character string of the character strings;
   generating pairs of character strings from different images of the plurality of images;
   generating pairwise comparisons between the pairs of character strings;
   correlating the candidate characters based on the pairwise comparisons; and
   selecting target characters from the candidate characters based on one or more predetermined selection criteria.

9. The computer-readable storage medium of claim 8, wherein the plurality of images show the license plate at different perspectives.

10. The computer-readable storage medium of claim 8, wherein the instructions when executed are further operable to perform operations comprising determining the candidate characters based on one or more character recognition techniques.

11. The computer-readable storage medium of claim 8, wherein the one or more predetermined selection criteria comprises selecting target characters from among the candidate characters based on cross correlation over the plurality of images.

12. The computer-readable storage medium of claim 8, wherein the one or more predetermined selection criteria comprises selecting target characters from among the candidate characters based on one or more longest common subsequence (LCS) techniques.

13. The computer-readable storage medium of claim 8, wherein, to select the target characters, the instructions when executed are further operable to perform operations comprising:
   comparing a first string of characters of a first image of the plurality of images of the license plate to a second string of characters of a second image of the plurality of images of the license plate;
   identifying matched characters between the first string of characters and the second string of characters; and
   selecting the target characters based on the identifying of the matched characters.

14. The computer-readable storage medium of claim 8, wherein the instructions when executed are further operable to perform operations outputting a string of the target characters, and wherein the string of the target characters represents actual characters of the license plate.

15. A computer-implemented method comprising:
   detecting a license plate of a vehicle;
   capturing a plurality of images of the license plate;
   recognizing character strings in the plurality of images;

recognizing candidate characters in the character strings, wherein the candidate characters are characters that are initially recognized in a character string of the character strings;

generating pairs of character strings from different images of the plurality of images;

generating pairwise comparisons between the pairs of character strings;

correlating the candidate characters based on the pairwise comparisons; and selecting target characters from the candidate characters based on one or more predetermined selection criteria.

16. The method of claim 15, wherein the plurality of images show the license plate at different perspectives.

17. The method of claim 15, further comprising determining the candidate characters based on one or more character recognition techniques.

18. The method of claim 15, wherein the one or more predetermined selection criteria comprises selecting target characters from among the candidate characters based on cross correlation over the plurality of images.

19. The method of claim 15, wherein the one or more predetermined selection criteria comprises selecting target characters from among the candidate characters based on one or more longest common subsequence (LCS) techniques.

20. The method of claim 15, wherein, to select the target characters, the method further comprises:

comparing a first string of characters of a first image of the plurality of images of the license plate to a second string of characters of a second image of the plurality of images of the license plate;

identifying matched characters between the first string of characters and the second string of characters; and selecting the target characters based on the identifying of the matched characters.

\* \* \* \* \*